United States Patent [19]

Oelbermann et al.

[11] 4,172,793

[45] Oct. 30, 1979

[54] FILTER PRESS

[76] Inventors: Max Oelbermann, Max-von-Laue-Str. 3, Remscheid; Karl A. Rademacher, Hatzfelderstr. 33; Helmut Strohn, Helmutstr. 2, both of Wuppertal, all of Fed. Rep. of Germany

[21] Appl. No.: 940,771

[22] Filed: Sep. 8, 1978

[30] Foreign Application Priority Data

Sep. 24, 1977 [DE] Fed. Rep. of Germany ....... 2743106

[51] Int. Cl.² ............................................. B01D 25/12
[52] U.S. Cl. ..................................... 210/230; 210/231; 100/199
[58] Field of Search ............... 210/224, 225, 226, 227, 210/228, 229, 230, 321; 16/87 B, 91, 93 R, 93 D, 96 D, 102; 100/199

[56] References Cited

U.S. PATENT DOCUMENTS

| 3,457,677 | 7/1969 | Ziegler | 16/93 R |
|---|---|---|---|
| 3,866,658 | 2/1975 | Smith | 16/93 R |
| 4,105,559 | 8/1978 | Busse et al. | 210/225 |

FOREIGN PATENT DOCUMENTS

| 1109647 | 6/1961 | Fed. Rep. of Germany | 210/230 |
|---|---|---|---|
| 424502 | 2/1935 | United Kingdom | 210/188 |
| 800724 | 9/1958 | United Kingdom | 210/230 |
| 879164 | 10/1961 | United Kingdom | 210/230 |

*Primary Examiner*—Charles N. Hart
*Assistant Examiner*—David R. Sadowski
*Attorney, Agent, or Firm*—Abraham A. Saffitz

[57] ABSTRACT

The invention relates to a filter press construction of the type having a plurality of filter plates suspended from two parallel I beam carriers, the filter plates being provided with a novel supporting arm suspension which prevents undesired swinging. The supporting arms are bent to diverge on both front and back sides of the filter plates, two arms on each side of the vertical center of the plate to provide a novel suspension consisting of two leading bent arms and two lagging bent arms for each filter plate in its operating condition suspended for movement on the I beam carrier. The arms of the filter plates are provided with roller or equivalent sliding elements to facilitate shifting movement on the guiding flange surface of the parallel I beam carriers. This unique leading and lagging supporting arm construction on the I beam carrier eliminates serious swinging problems encountered with conventional filter presses using the parallel I beam carrier suspension for the filter plates.

4 Claims, 5 Drawing Figures

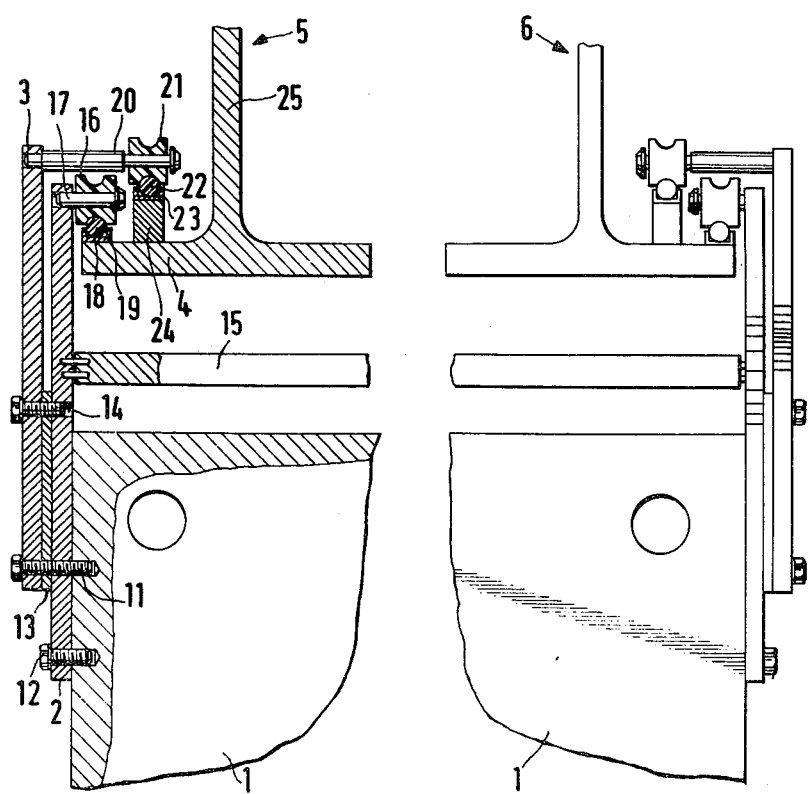

FILTER PRESS

CROSS REFERENCE TO RELATED APPLICATION

This application is based, for priority, on West German Patent Application No. P 27 43 106.7 filed Sept. 24, 1977.

BACKGROUND OF THE INVENTION

1. Field of the Invention

This invention relates to a filter press with a plurality of filter plates shiftably suspended from two parallel I beam carriers in which the filter plates each have supporting arms on both sides of their vertical center. These supporting arms are bent inwardly and counter to the shifting direction of the filter plate. The supporting arms of the filter plates are each provided with rollers or equivalent sliding members which run on the guide surface on the I beam carrier flanges.

2. Description of the Prior Art

In the case of the known filter presses furnished with a filter plate conveyor means, the filter plates are each suspended shiftably and movably on both sides of their vertical center by means of a supporting arm which extends from the filter plate to the parallel guide carriers of I beam shape. In the case of the larger filter presses using the I beam carriers, as described herein, the filter plates, after one filtering process, are pulled off one by one and successively by means of a special conveyor to separate each filter plate from the remaining filter pack for the purpose of ejecting the filter cake. Because of the size of the plate and cake it is often necessary that strong forces be applied to the filter plate in order to overcome the adhesion of the filter cake. Whenever the filter plates are suspended with vertical supporting arms from the guide carriers, then a strong and long lasting swinging of the plates occurs. In order to limit this objectionable swinging characteristic or tendency, it has been suggested and is known that it is necessary to bend the two supporting arms in opposite directions, with respect to the plate, so that the points of suspension lie before and behind the plane of the plate in relation to the I beam carrier. It is true that by this arrangement the swinging capacity of the filter plates is clearly reduced, but in the case of a fast filtering process or a jerky stop of the filter plates, or in the case of a stubbornly adhering filter cake, a violent swinging still occurs as a result of which the permissable operating speed and the rhythmic cycle of the filtering operations is seriously limited in the automatic opening of the filter presses of large size. This is a considerable disadvantage, particularly when the filter plate, just pulled off, is to be cleaned with an automatically operated spraying device which is guided up and down along the main surfaces of the filter plate and enclosing the filter plate cyclically since the spraying device in order to avoid damage to the filter cloths may, must be returned to its operating position only after the swinging of the filter plate has stopped. Further it must be ascertained that the filter plates are not likely to swing again due to displacement caused by the pressure of the sprayed water.

OBJECTS OF THE INVENTION

The object of the invention is based on the task of creating a more stable filter plate suspension which guarantees safety against swinging to the highest degree possible.

SUMMARY OF THE INVENTION

According to the invention this above object is realized by having each filter plate suspended on two points before and on two points behind the filter plate by two leading and two lagging supporting arms from the guide carriers to thereby provide a four point suspension with two points of suspension lying before and two points of suspension lying behind the filter plate with the respective supporting arms mutually laterally displaced so far that the leading and lagging supporting arms of adjacent filter plates may be moved past each other.

By these specific measures the swinging capacity of the filter plates is so greatly reduced that the filter plates themselves, in the case of a jerky movement, do not swing at all or do swing only slightly and for a very short time, so that the permissible speed of cyclic filtering and washing in the case of the plate by plate opening of the filter press and the double side spraying of the filter plates is no longer limited by a swinging of the filter plate.

There is provided in a preferred embodiment of the invention a set of guide tracks on the flanges of the two I beam carriers, namely two parallel guide tracks from which the filter plates are suspended on both sides of their vertical centers solely by means of the pair of supporting arms. The one supporting arm of the pair is bent in and the other counter to the sliding direction. The two supporting arms which are bent in the one direction are supported by the guide track always adjacent to the edge of the flange, whereas the two supporting arms which are bent in the other direction are displaced away from the I beam carrier and overlap the guide track which is attached to the edge of the flange. These two arms in the other direction are supported by the guide track adjacent to the carrier web.

Another characteristic of the invention is based upon the structural arrangement of the supporting arms employing pairs of supporting arms of unequal length wherein the longer supporting arms are supported by the guide tracks adjacent to the I beam carrier webs and are each pointed in the direction of the opening of the pack of filter plates in the filter press which provides the unexpected result that any swinging movement will be further suppressed. Although the filter plates are easily shiftable by the roller or equivalent slipping means on the carrier rails, any unintended movement of the filter plates to cause further rolling or slipping after completion of the automatic conveying step is avoided due to the unique suspension. This two-fold requirement against swinging movement during start and atop while being easily shiftable is optimally achieved according to the invention by using plastic sliding members consisting of high lubricity material, e.g., polyethylene in combination with equally self lubricating plastic rails, preferably of polyamide. It is also possible to use plastic sliding members other than polyethylene, such as polyamide in combination with plastic rails of polyethylene.

BRIEF DESCRIPTION OF THE DRAWINGS

A preferred embodiment of the invention is illustrated in the drawings and will be more completely described in the following detailed description.

FIG. 4 shows the suspension for the filter plate in a side view which is of FIG. 3 viewed from the right side; and FIG. 5 shows a cross sectional view which is cut through a pair of supporting arms along lines V—V in FIG. 3.

DESCRIPTION OF THE PREFERRED EMBODIMENT

Figure 1:
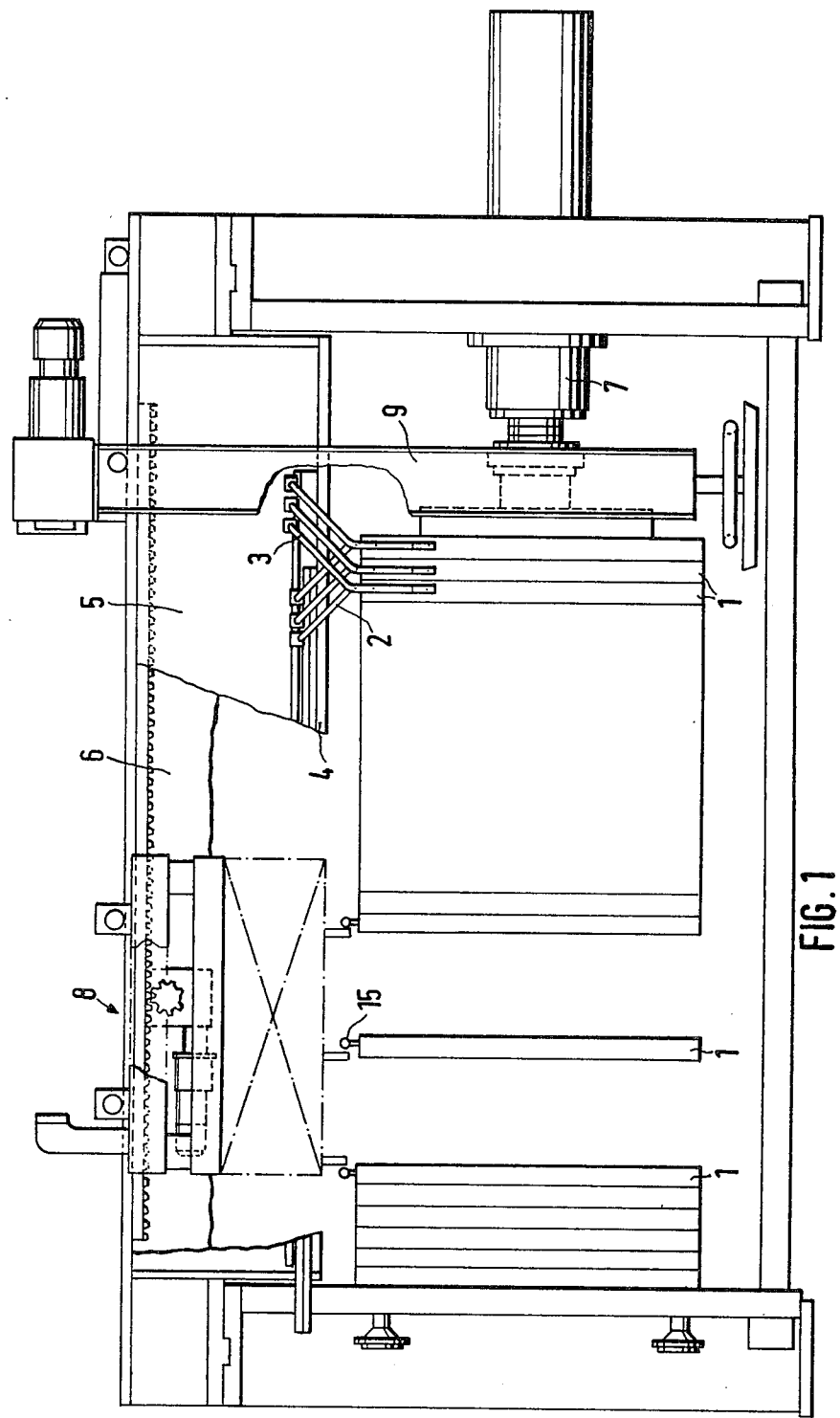
FIG. 1 shows a filter press in side elevational view with parts broken away to show the plate opening mechanism.
Figure 2:
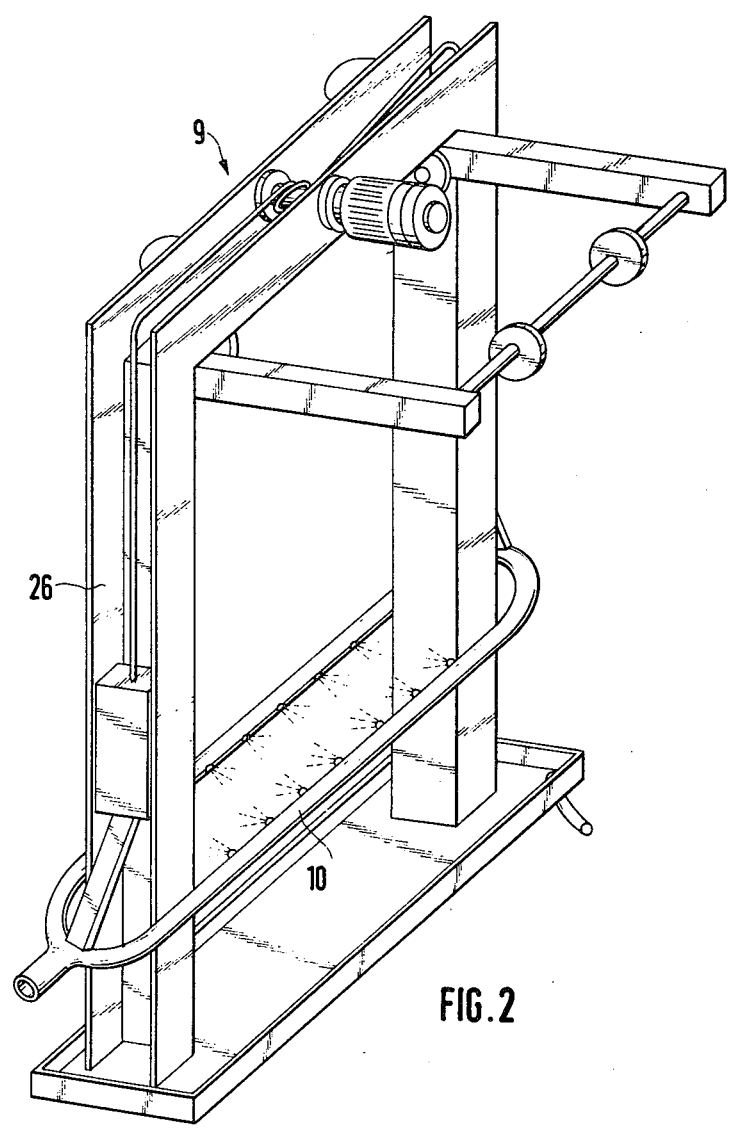
FIG. 2 shows a simplified perspective view of a spraying device used to wash the filter plates.

FIG. 1 shows a filter press according to the invention having a multiplicity of filter plates 1 which are suspended movably by leading supporting arms 2 and lagging supporting arms 3 attached to the outer narrow sides of the plates, always from the lower flanges 4 of two parallel I guide carriers 5 and 6. The plates are pushed together to a pack for filtering by means of a hydraulic piston/cylinder mechanism 7. After the filtering process is completed the filter plates are successively moved apart by means of a plate conveyor means 8 in order to eject the cake from the filter plate. In the first stage of the plate conveying movement the filter plate reaches a free intermediate position 1' and in this first position 1' the plates are sprayed with water on both sides with the device 9 of FIG. 2. The spraying device 9 in FIG. 2 is fitted with annular spraying pipe 10 which is described in greater detail hereinafter.

Figure 3:
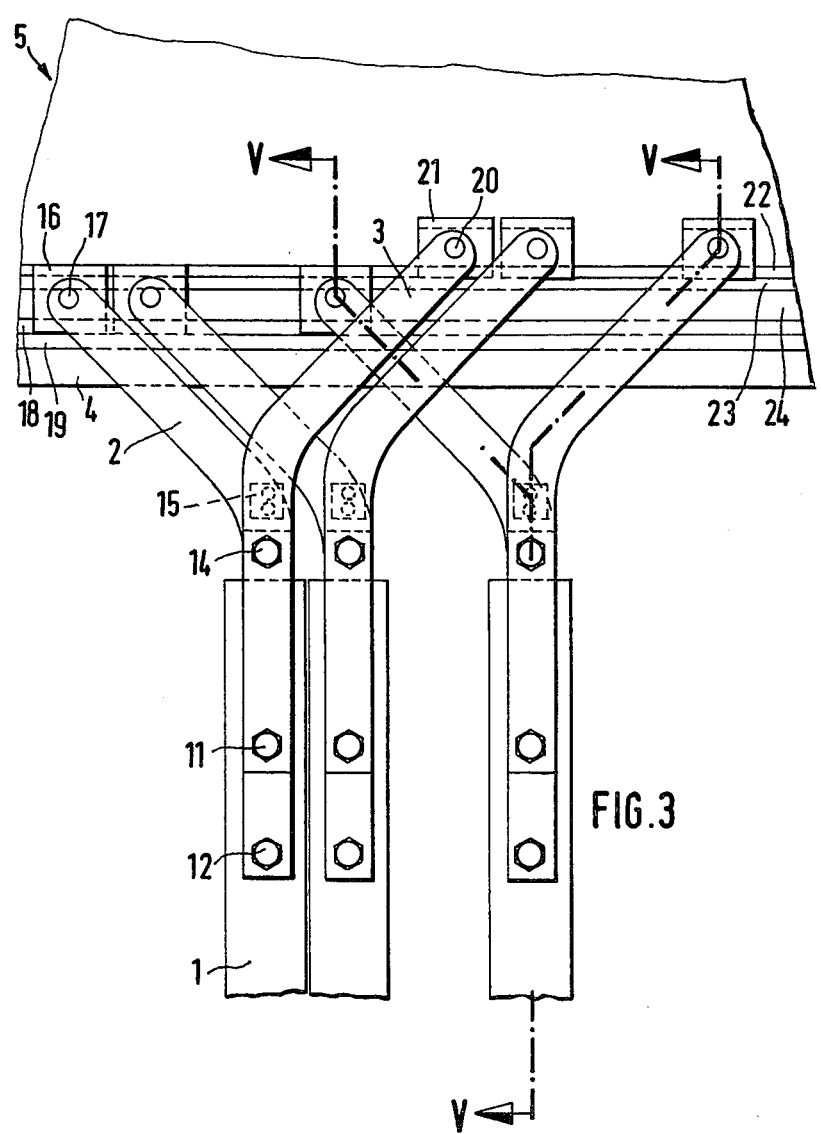
FIG. 3 shows the novel suspension for the filter plates in a side elevational view.

As shown in FIG. 3 the supporting arms 2 and 3 are offset at an angle, preferably at an angle of 45 degrees, and are attached by screws 11 and 12 at each narrow side of the filter plate 1.

The supporting arms 2 and 3 are superposed with their vertical side separated by a separator piece 13. A screw 14 connects the supporting arms with the separator piece 13. Between the pairs of supporting arms 2 and 3 there is disposed a round projection member 15 as shown in FIG. 1 on the narrow side of the filter plate. This projection 15 cooperates with the conveying means 8 as is indicated schematically at the top center portion of FIG. 1. The bent supporting arms 2 and 3 are supported directly on the outside flanges 4 of the parallel I beam guide carriers 5 and 6. The supporting arm 2 is mounted by means of a sliding piece 16 which preferably consists of polyethylene provided with a semicircular friction bearing groove and which is held by a screw bolt 17 on the round plastic rail 18 formed of polyamide. The rail 18 lies in a U-shaped intermediate bearing piece 19 which is located at the edge of the flange 4 of the I beam carrier.

The supporting arm 3 is bent opposite to the supporting arm 2 and is much longer in its slanting part so that it may overlap the supporting arm 2. At the end of the supporting arm 3 a long screw bolt 20 is attached which projects beyond the sliding piece 16 of the supporting arm 2. On this screw bolt 20 a slider 21 is attached which is seated on a round plastic rail 22. This rail lies in a U-shaped intermediate bearing piece 23 which is attached to the supporting member 24. Supporting member 24 is rectangular in its cross section and lies near the carrier web 25 as shown in FIG. 5. The sliders 16 and 21 in FIG. 5 have a length which is approximately equal to the thickness of one filter plate. These sliders 16 and 21 have friction bearing grooves at two opposite sides and may thus be used on both sides.

In the pushed together state of the filter plate pack, the short sides of the supporting arms 2 will lay in side view in the manner shown in FIG. 1 so as to be behind the longer sides of the supporting arms 3 which point in the other direction. After pushing the plates together the short and the long supporting arms 2 and 3 move past each other at a distance which corresponds to the thickness of the separator piece 13.

The spraying device 9, shown in FIGS. 1 and 2, is movable on the upper flanges of the guide carriers 5 and 6 and is readily coupled to the conveyor 8. It consists essentially of a rectangular frame 26 and spraying pipe 10 which may be moved up and down along the vertical struts of the frame 26. Upon opening of the filter press, the spraying device is coupled to the conveyor and every filter plate is introduced in the intermediate position 1' into the rectangular frame 26 after which the annular spraying pipe 10 is moved up and down and the plates are sprayed on both sides with water. The two halves of the spraying pipe may enclose the plates tightly between them and any swinging of the plate is safely excluded even in the case where uneven pressure of the spraying water may push the plate in a jerky manner.

Having thus disclosed, we now claim:

1. In a filter press having a plurality of filter plates suspended for shifting movement from the flanges of two parallel I beam carriers, that improvement comprising:

two pairs of supporting arms attached to each filter plate, which pairs are bent to diverge forwardly from the front side and backwardly from the back side of the filter plate to thereby present one pair on each side of the vertical center of the filter plate, whereby the ends of two of said supporting arms, in plan view, lie behind the plate and the ends of the other two supporting arms lie ahead of the plate;

the bent divergent arm portions of said supporting arms which are attached to said filter plate being in a direction which is in and counter to the direction of shifting movement of said filter plate during the opening, the ejecting of the filter cake and washing operations to thereby minimize swinging movement of the filter plate during said operations;

the lengths of said divergent portions being such that the leading and lagging arms of adjacent filter plates pass each other;

plastic guide tracks on the flanges of said I beam carriers; and grooved sliding means for movement on said guide tracks located behind said arms and attached thereon while resting on said flange guide tracks of the I beam carrier which facilitate easy shifting movement and diminish sudden or jerky movements causing swinging of the filter plate while shifting said suspended plates during opening, filter cake ejecting and cleaning operations; and wherein the bent portion of one of the supporting arms of each pair is bent counter to the direction of shifting movement of the filter plate during the opening and is supported on the plastic guide track adjacent the edge of a flange of the I beam carrier by being directed inwardly to rest thereon while the other of the supporting arms is bent in the direction of shifting movement of the filter plate during the opening and overlaps the guide track on the flange, is displaced away from the I beam carrier and is supported on the guide track adjacent to the carrier web.

2. A filter press as claimed in claim 1 wherein one of said supporting arms in a pair is longer than the other of said supporting arms of the pair and said longer arm is supported on a plastic guide track adjacent to the I beam carrier web and is pointed in the direction of shifting movement of the filter plate away from the pack of filter plates.

3. A filter press as claimed in claim 2 wherein the sliding means at the ends of said supporting arms are formed of polyamide and the plastic guide tracks traversed by said members are formed of polyethylene.

4. A filter press as claimed in claim 2 wherein the sliding means at the ends of said supporting arms are formed of polyethylene and the plastic guide tracks traversed by said members are formed of polyamide.

* * * * *